(12) United States Patent
VonDerHaar et al.

(10) Patent No.: US 6,246,916 B1
(45) Date of Patent: Jun. 12, 2001

(54) LEARNING PROGRAMMABLE LIMIT SWITCH AND METHOD PROVIDING REAL-TIME PASSIVE FEEDBACK

(75) Inventors: Timothy J. VonDerHaar, Hamilton, OH (US); Brian D. Mabee, Marco Island, FL (US)

(73) Assignee: Force Control Industries, Inc., Fairfield, OH (US)

( * ) Notice: Subject to any disclaimer, the term of this patent is extended or adjusted under 35 U.S.C. 154(b) by 0 days.

(21) Appl. No.: 09/104,023

(22) Filed: Jun. 24, 1998

(51) Int. Cl.$^7$ .................................................. G05B 11/01
(52) U.S. Cl. .............................. 700/11; 700/45; 700/61
(58) Field of Search .................................. 700/11, 12–14, 700/17–19, 44, 45, 46, 61, 63, 9–10

(56) References Cited

U.S. PATENT DOCUMENTS

| | | | |
|---|---|---|---|
| 3,974,432 | 8/1976 | Thompson | 318/562 |
| 4,016,769 | 4/1977 | Froschle | 74/37 |
| 4,148,400 | 4/1979 | Cross | 414/750 |
| 4,220,058 | * 9/1980 | Petzold | 74/751 |
| 4,242,621 | 12/1980 | Spaulding | 318/601 |
| 4,322,669 | 3/1982 | Fukuma et al. | 318/571 |
| 4,350,941 | 9/1982 | McClure et al. | 318/603 |
| 4,400,670 | * 8/1983 | Mostosi | 335/6 |
| 4,401,930 | 8/1983 | Kato et al. | 318/603 |
| 4,429,211 | * 1/1984 | Carstens et al. | 219/121 |
| 4,470,108 | 9/1984 | Kato et al. | 364/167 |
| 4,494,206 | 1/1985 | Imazeki et al. | 364/474 |
| 4,510,565 | 4/1985 | Dummermuth . | |
| 4,511,884 | 4/1985 | Serev et al. | 340/347 |
| 4,542,471 | 9/1985 | Inaba et al. | 364/513 |
| 4,547,692 | 10/1985 | Spaulding | 318/592 |
| 4,555,758 | 11/1985 | Inaba et al. | 364/174 |
| 4,578,748 | 3/1986 | Abe et al. | 364/167 |
| 4,586,124 | 4/1986 | Wiederstein | 364/167 |
| 4,651,073 | 3/1987 | Shimizu et al. . | |
| 4,835,676 | 5/1989 | Kumar et al. | 364/142 |
| 4,870,590 | 9/1989 | Kawata et al. | 364/468 |
| 4,879,642 | 11/1989 | Malka et al. | 364/131 |

(List continued on next page.)

OTHER PUBLICATIONS

"CLPC" Closed–Loop Indexing Drives, The Quickest from point A to Point A, 1998 Forces Control Industries, Inc., 3660 Dixie Highway, Fairfield, Ohio 45014.

*Primary Examiner*—Thomas Lee
*Assistant Examiner*—Rijue Mai
(74) *Attorney, Agent, or Firm*—Jacox, Meckstroth & Jenkins

(57) ABSTRACT

This invention relates to a learning programmable limit switch for use in a motion system which provides passive feedback to a controller. The learning programmable limit switch is capable of causing the motion control system to operate in accordance with a user-programmed motion profile. The learning programmable limit switch provides the capability of accurately "learning" and controlling the positions at which a motion system changes velocity, as well as the timing at which the system causes a driven mechanism to, for example, stop. The system is intended for use in variable speed drives, hydraulic, pneumatic drive systems or any system where real time, passive feedback control is desired. In one typical environment, the learning programmable limit switch is connected to an output shaft of a driver. The outputs of the learning programmable limit switch are turned ON/OFF based upon the detected angular position of the output shaft. These outputs are then fed back to a controller, such as a programmable logic controller or PLC, to be used as passive feedback for the PLC to know when to engage/disengage the drive system which is typically a motor, clutch/brake system. The PLC then initiates the drivers motion, with the learning programmable limit switch detecting and tracking such motion, via the output shaft rotation, and cycle its outputs based upon an user-programmed motion profile.

38 Claims, 11 Drawing Sheets

U.S. PATENT DOCUMENTS

| | | |
|---|---|---|
| 4,891,568 | 1/1990 | Shibata et al. . |
| 4,894,594 | 1/1990 | Kawamura et al. . |
| 5,039,925 | 8/1991 | Schap .................................. 318/282 |
| 5,155,681 | 10/1992 | Aoki et al. . |
| 5,159,248 | 10/1992 | Kaneko et al. ...................... 318/560 |
| 5,202,613 * | 4/1993 | Kruse .................................. 318/254 |
| 5,227,965 | 7/1993 | Klaes et al. ......................... 364/142 |
| 5,249,118 | 9/1993 | Smith . |
| 5,303,333 * | 4/1994 | Hoos ..................................... 395/80 |
| 5,878,896 * | 3/1999 | Eudier et al. ........................ 212/270 |
| 5,997,778 * | 12/1999 | Bulgrin .............................. 246/40.1 |
| 6,008,610 * | 12/1999 | Yuan et al. .......................... 318/592 |
| 6,060,854 * | 5/2000 | Yutkowitz ............................ 318/632 |

\* cited by examiner

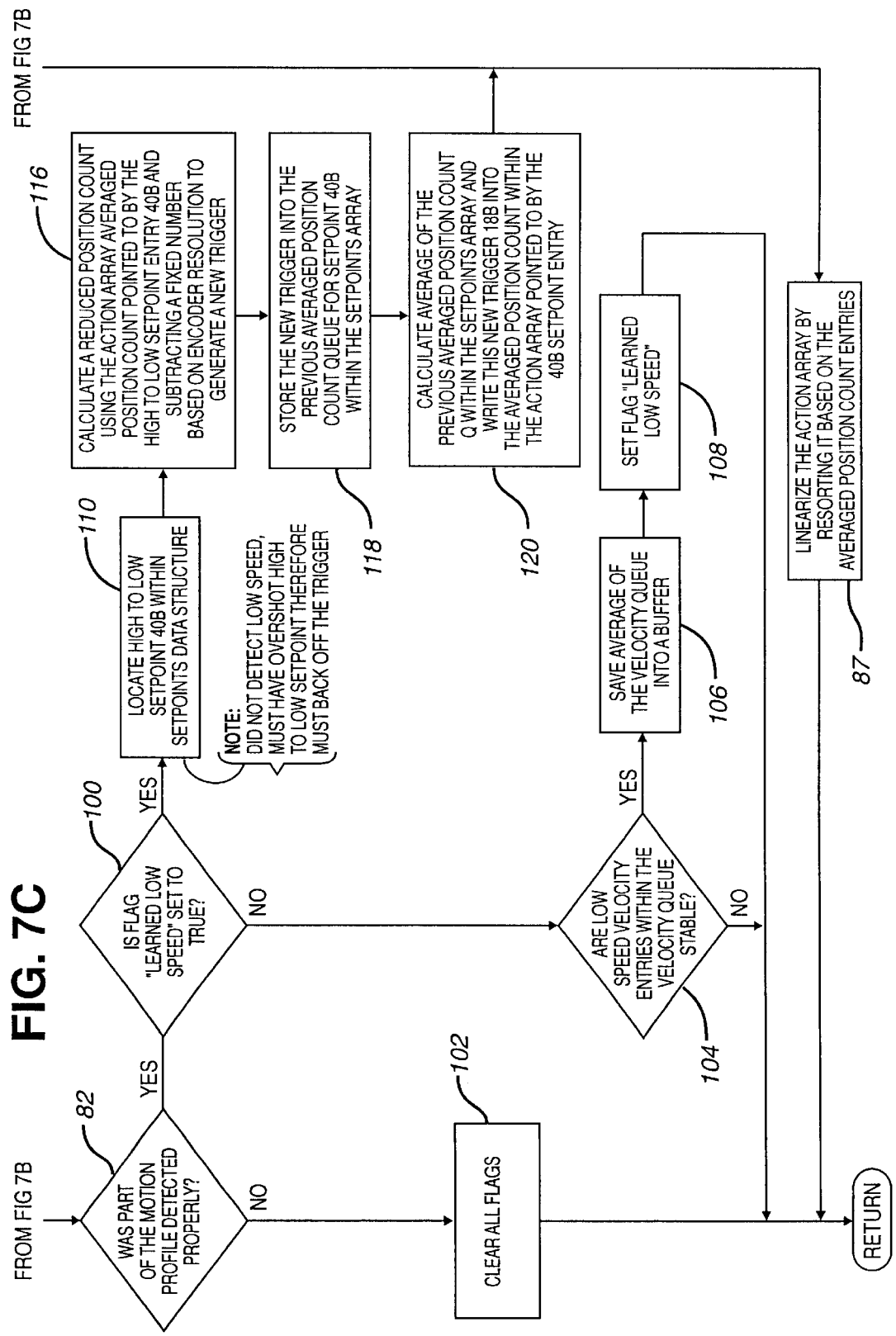

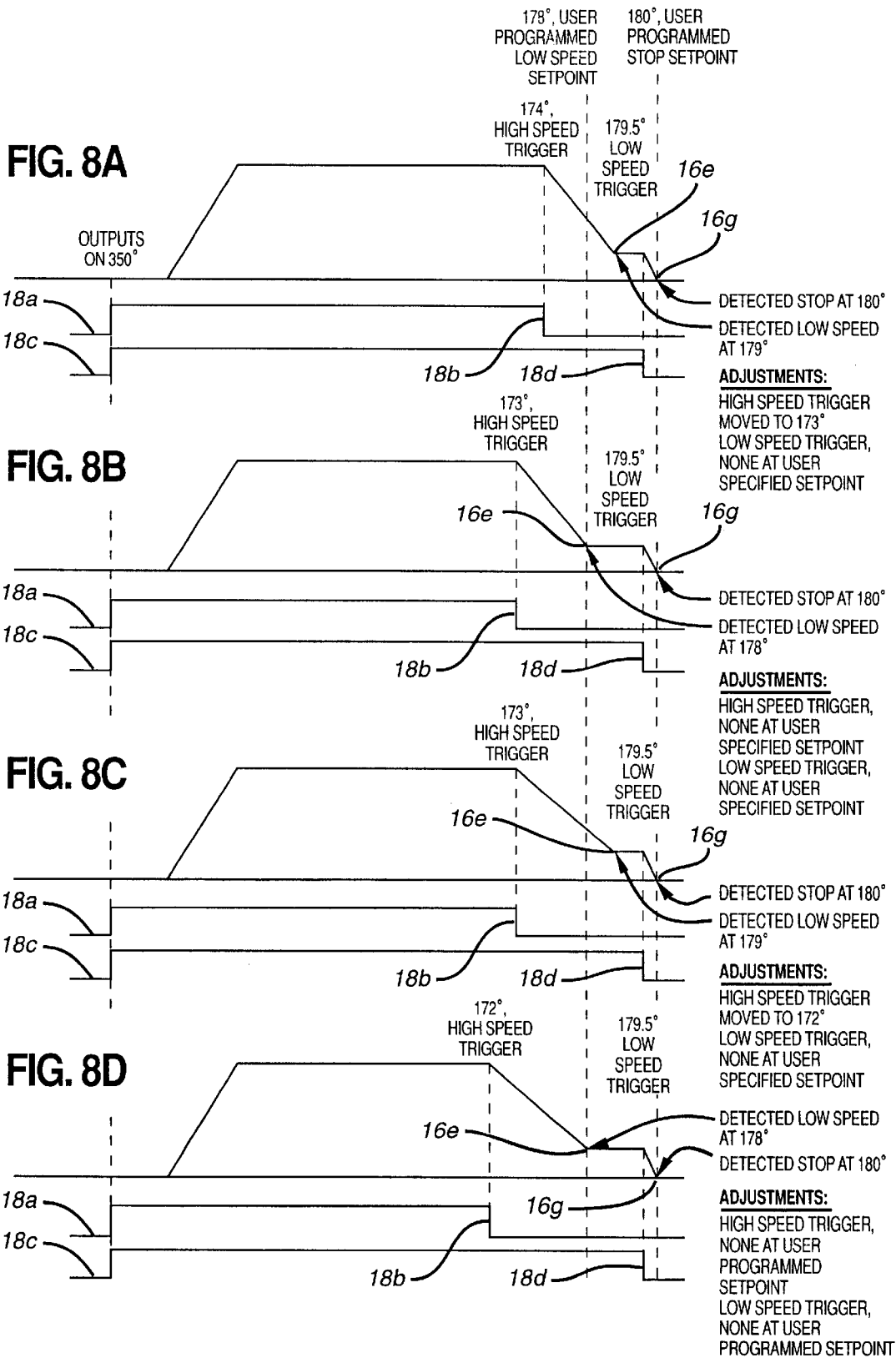

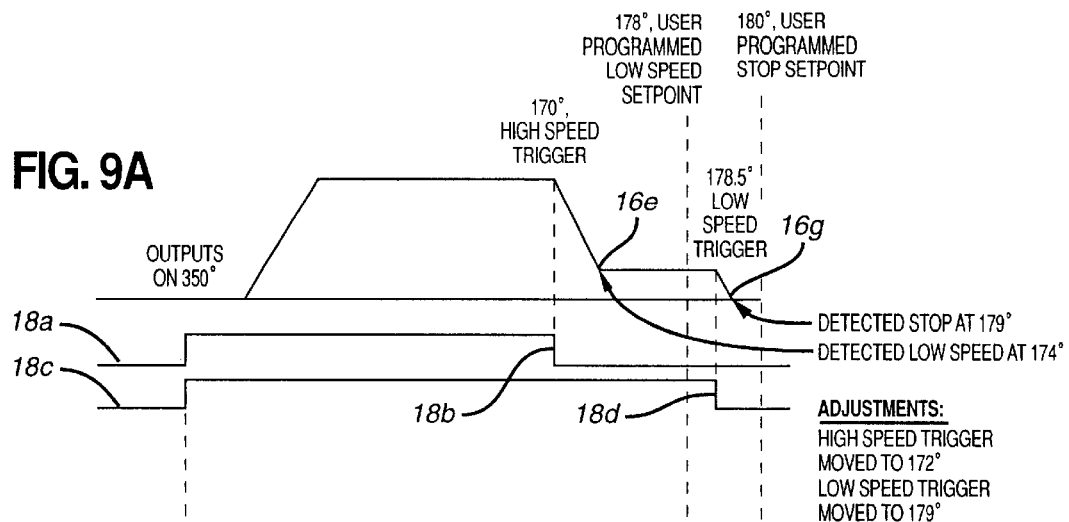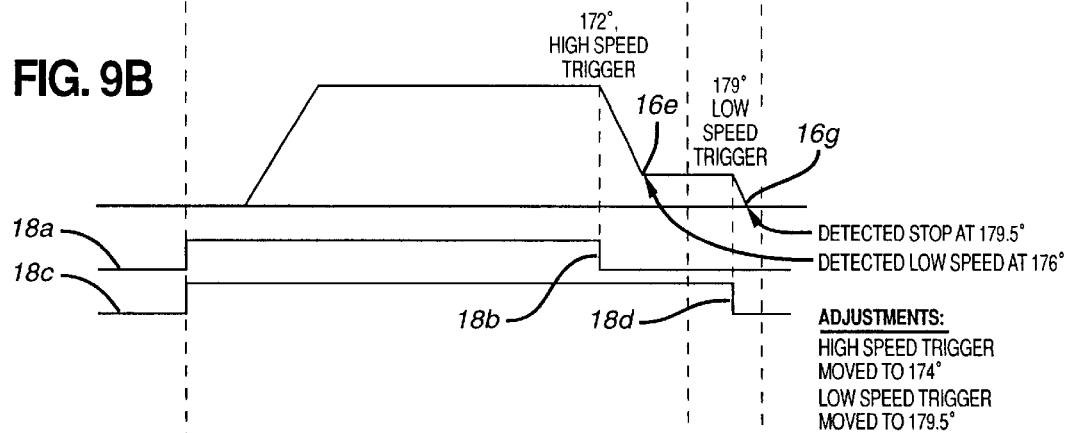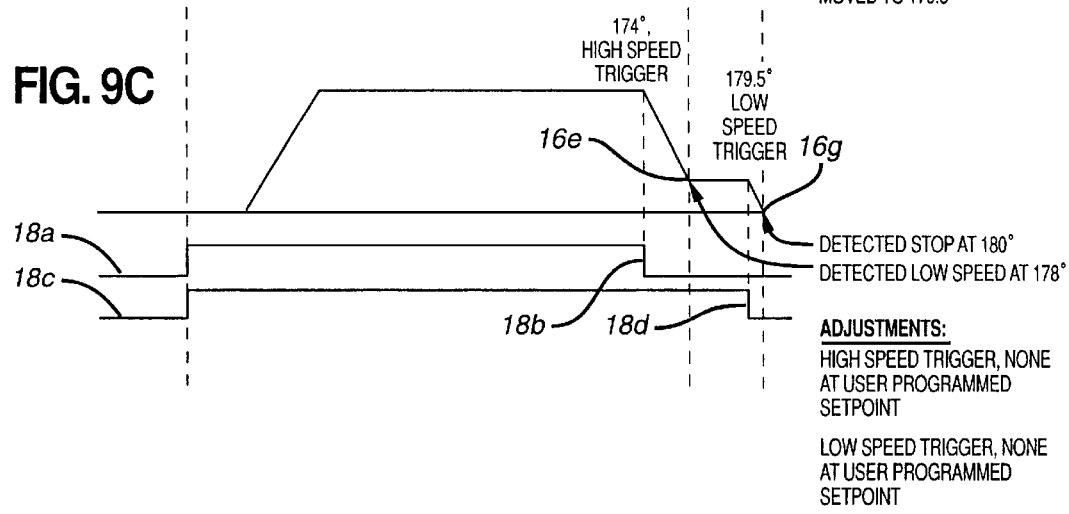

LEARNING PROGRAMMABLE LIMIT SWITCH AND METHOD PROVIDING REAL-TIME PASSIVE FEEDBACK

BACKGROUND OF THE INVENTION

1. Field of the Invention

This invention relates to a learning programmable limit switch and, more particularly, a motion system which utilizes a learning programmable limit switch to provide real-time passive feedback for a controller to control the operation of a drive system in accordance with a user-programmed motion profile.

2. Brief Description of the Related Art

In the field of motion control systems, pressure transducers can be applied to control the ON/OFF state of external circuits. Such a system monitors position and sets or resets one or more outputs at predefined positions or "setpoints." The mechanisms controlled by this system usually have a constant delay from actuation to the desired mechanical reaction. An offset can be added to the transducer position in order to activate the output circuit before its actual setpoint has been reached to compensate for this mechanical delay. As the velocity of the mechanical system increases, the time added by such a positional offset decreases. Therefore, a larger proportional offset is needed to offset for the same mechanical delay at higher speeds. In many mechanical systems the delay for mechanism activation is different from the delay for the deactivation of the mechanism. This requires two different positional offsets for delay compensation. When the circuit is OFF an ON offset is used, and when the circuit is ON an OFF offset if needed.

Usually such a system is implemented in software by a microcontroller. The microcontroller reads the transducers at fixed time intervals and calculates velocity. The microcontroller computes the offsets based on the calculated velocity and adds these offsets to the position. The microcontroller compares this offset position to a table of ON/OFF positions. The table entry specifies the desired output state. The microcontroller can control many circuits from one position reading. This position typically corresponded only to a stop position. Typically, the microcontrollers could not operate at high speeds or with many simultaneous controlled circuits.

Motion control system of the past oftentimes had difficulty handling environmental changes. For example, in a pallet shuttle system which shuttles a pallet between a first station and a second station, the shuttle system drives the pallet, for example, from a first station at a high speed until it reaches the second station, whereupon the pallet system slows to a slower speed until finally it is brought to a complete stop at the second station.

During a manufacturing process, it is desirable to minimize the overall cycle time it takes to shuttle the pallet between theses stations. When the motion system was "cold", the time associated with the transition between the high to low speeds and the low speed to stop was very short. However, as the motion system warmed up, the duration of this time period would tend to increase, thereby causing the pallet to "overshoot" the desired stopping point and/or point at which the slow speed was suppose to occur. Consequently, it was required to make manual adjustments to the system so that the pallet would be shuttled as desired.

Similarly, as the system cooled down, the time required to transition between speeds was less which would result in the pallet "undershooting" the points corresponding to when the user desired the pallet to begin to be driven at the slow speed or hit the stop position.

U.S. Pat. No. 5,227,965 issued to Klaes et al. and assigned to Magnetek Controls of Clawson, Mich. illustrates the use of a programmable limit switch which employs high speed special purpose hardware and a general purpose microcontroller to achieve high speed limit switch operation. A state sequencer controls the high speed special purpose hardware in a fixed sequence. The states sequencer latches position data, and recalls position offsets from a memory. A hardware digital adder sums the position and offset with this summed offset position used as an address in output tables for selecting an output status word. The microcontroller operates asynchronously with respect to the state sequencer. The microcontroller initializes and updates the memories. The microcontroller calculates the velocity from repetitive position signals and writes the corresponding window offsets to memory. A selection circuit picks out the status bit of the particular output circuit. The outputs are shifted together and latched to the output drivers.

Unfortunately, this system and other motion systems of the past could only accommodate for a stop position. They did not automatically adjust during real time operation of the motion control system utilizing sensed feedback corresponding to the motion of, for example, an output shaft of the drive system to learn and adjust to provide real time passive feedback to the controller based upon position information.

Another problem with systems of the past is that they were utilized to detect velocity only and typically provide a velocity offset so that only a stop position would be properly achieved.

SUMMARY OF THE INVENTION

It is, therefore, an object of the invention to provide a real-time, learning programmable limit switch for providing passive feedback for accurately controlling movement in accordance with an user-programmed motion profile.

Another object of the invention is to provide a passive feedback system which will accurately monitor, control and "learn" not only a stop position, but transition positions between, for example, a first speed or velocity and a second speed or velocity.

Still another object of the invention is to provide a learning programmable limit switch which accounts for more than a single speed or position application which only accommodates for a stop position and which "learns" the offsets for transition points associated with transitions between speeds, as well as any desired stop positions.

In one aspect, this invention comprises a method of providing passive feedback for controlling a drive system comprising the steps of providing a programmable switch for facilitating controlling the operation of the drive system, programming the programmable switch with a first programmed setpoint corresponding to a first position of the drive system, a second programmed setpoint corresponding to a second position of the drive system, a first initial trigger point corresponding to when the drive system performs a first change from a first speed to a second speed, and a second initial trigger point corresponding to when the drive system performs a second change from the second speed to a third speed, energizing the drive system, using said first and second initial trigger points to effect the first and second changes, respectively, determining a first actual setpoint corresponding to a first actual position and a second actual setpoint corresponding to a second actual position, comparing the first programmed setpoint to the first actual setpoint and the second programmed setpoint to the second actual setpoint and adjusting at least one of the first initial trigger point or the second initial trigger point to provide an adjusted first trigger point or an adjusted second trigger point, respectively, in response to the comparison, and repeating the energizing, triggering, determining and comparing steps and if the first and second actual setpoints are not within a predetermined tolerance range of the first and second programmed setpoints, respectively, then repeating the adjusting step.

In another aspect, this invention comprises a process for providing passive feedback to facilitate maintaining a cycle time in a motion control system comprising the steps of providing a programmable switch capable of receiving a motion profile associated with a driver, determining an actual motion profile associated with the driver, comparing the actual motion profile to the motion profile, and adjusting outputs of the programmable switch in response to the comparing step such that the cycle time is achieved and maintained.

In still another aspect, this invention comprises, a programmable limit switch for providing passive feedback for use in a drive system comprising a driver under the control of a controller having a position indicated device associated therewith for providing a first position count and a second position count, the switch comprising programming means for receiving a first programmed setpoint corresponding to a first position of the drive system, a second programmed setpoint corresponding to a second position of the drive system, a first initial trigger point corresponding to a first position at which the drive system performs a first change from a first speed to a second speed, and a second initial trigger point corresponding to a second position at which the drive system performs a second change from the second speed to a third speed, determining means for determining a first actual setpoint corresponding to the first position count generated by the position indicating device and a second actual setpoint corresponding to the second position count generated by the position indicating device, and learning means for comparing the first programmed setpoint to the first actual setpoint and the second programmed setpoint to the second actual setpoint, for adjusting at least one of the first initial trigger point or the second initial trigger point to provide an adjusted first trigger point or an adjusted second trigger point, respectively, in response to the comparison so that the first and second actual setpoints are within a predetermined tolerance range of the first and second programmed setpoints, respectively.

In yet another aspect, this invention comprises a drive system capable of maintaining a cycle time comprising a motion control system comprising a position indicated device associated with a driven driver, the position indicating device being capable of generating a plurality of detected position counts, a programmable controller capable of receiving a desired motion profile for the driven driver and for determining an actual motion profile using the plurality of detected position counts, and a processor for comparing the actual motion profile to the motion profile and also for adjusting outputs of the programmable controller in response to the comparison such that the cycle time is maintained at a desired level.

Other objects and advantages of the invention will be apparent from the following description, the accompanying drawings, and the appended claims.

BRIEF DESCRIPTION OF ACCOMPANYING DRAWINGS

Figure 7A:
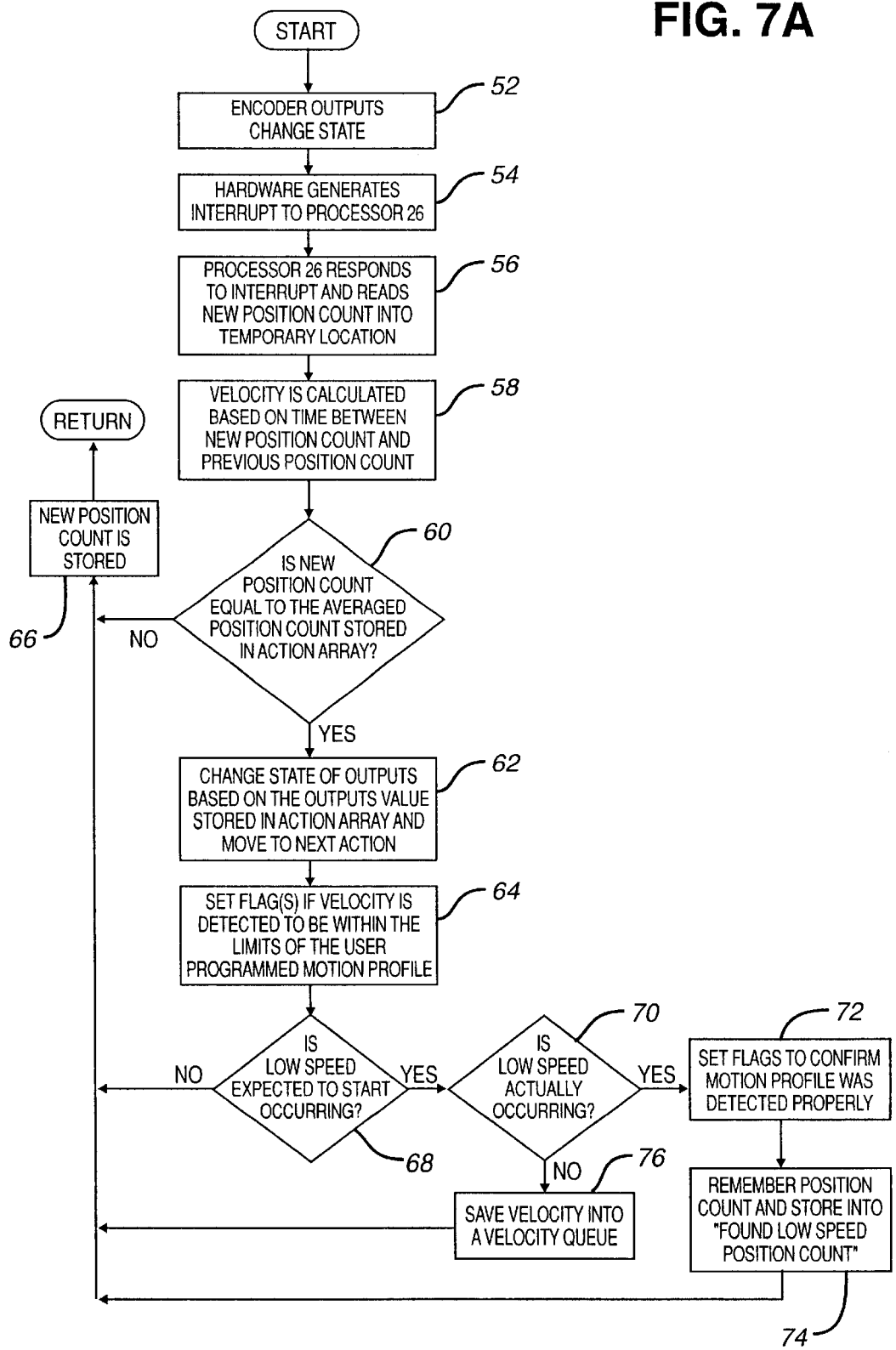
Figure 7B:
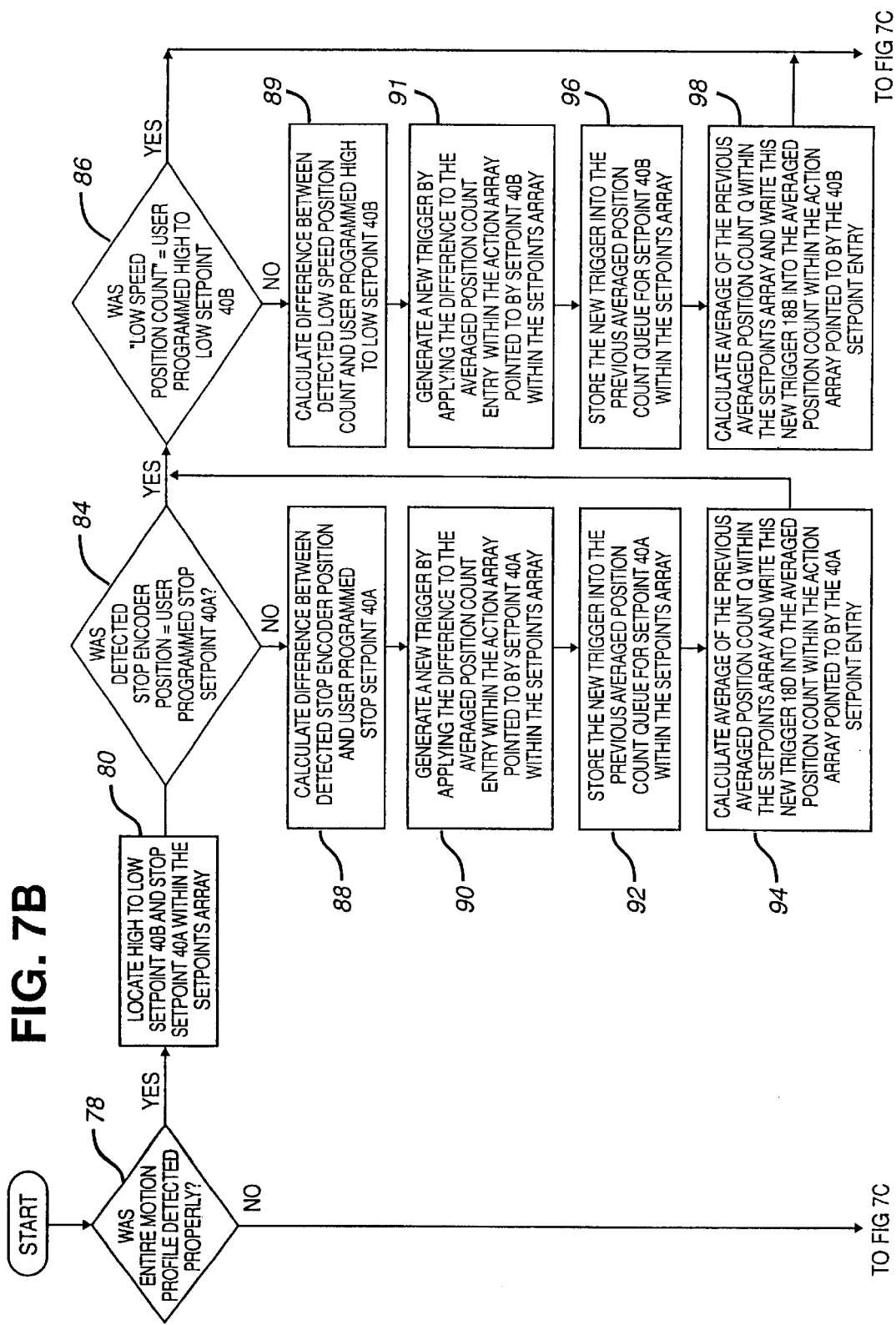

FIGS. 7A–7C, taken together, provide a schematic illustration of the method and procedure for achieving the learning function in accordance with one embodiment of the invention;

FIGS. 8A–8D provide a plurality of waveforms and outputs of a controller, learning programmable limit switch and actual motion achieved by the system and method of the present invention, providing an illustration of an "overshoot" and subsequent learning adjustment in accordance with one embodiment of the invention; and FIGS. 9A–9C provide another waveform illustration of the procedure and method of learning similar to FIGS. 8A–8D, illustrating the procedure and routine for providing learning adjustment.

DETAILED DESCRIPTION OF PREFERRED EMBODIMENTS

Figure 1:
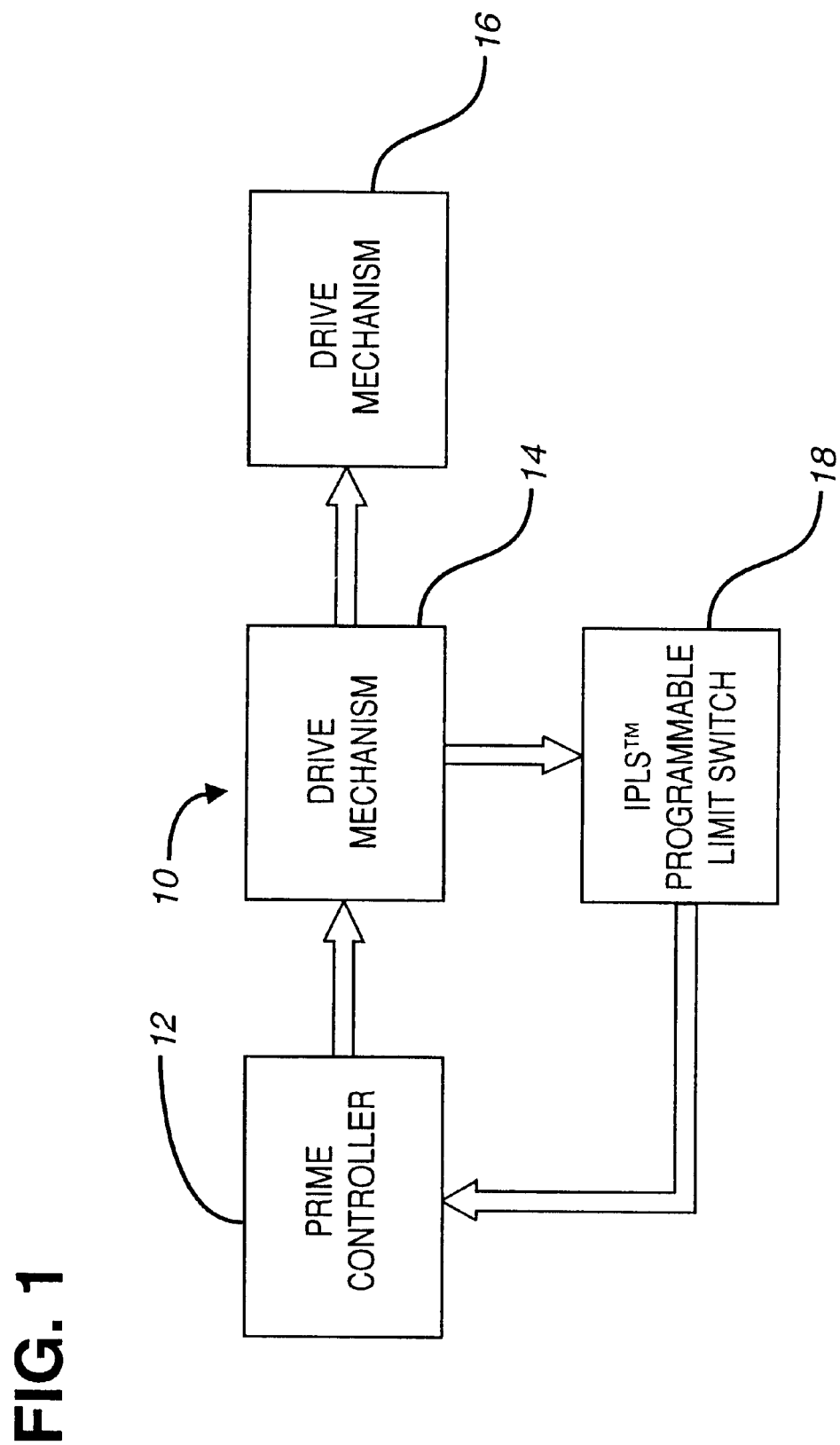
FIG. 1 is a schematic diagram of a motion system comprising a learning programmable limit switch in accordance with one embodiment of the invention.

Referring now to FIG. 1, a drive system 10 comprising a processor or controller 12 which controls the operation of a drive mechanism, drive means or driver 14 which, in turn, drives a driven mechanism 16, such as a transfer drive (not shown), a lift table (not shown), an indexing mechanism (not shown) or an indexing table (not shown).

The drive system 10 further comprises a learning programmable limit switch 18 which is coupled to drive mechanism 14 and which provides passive feedback to controller 12 in the manner described below.

Figure 2:
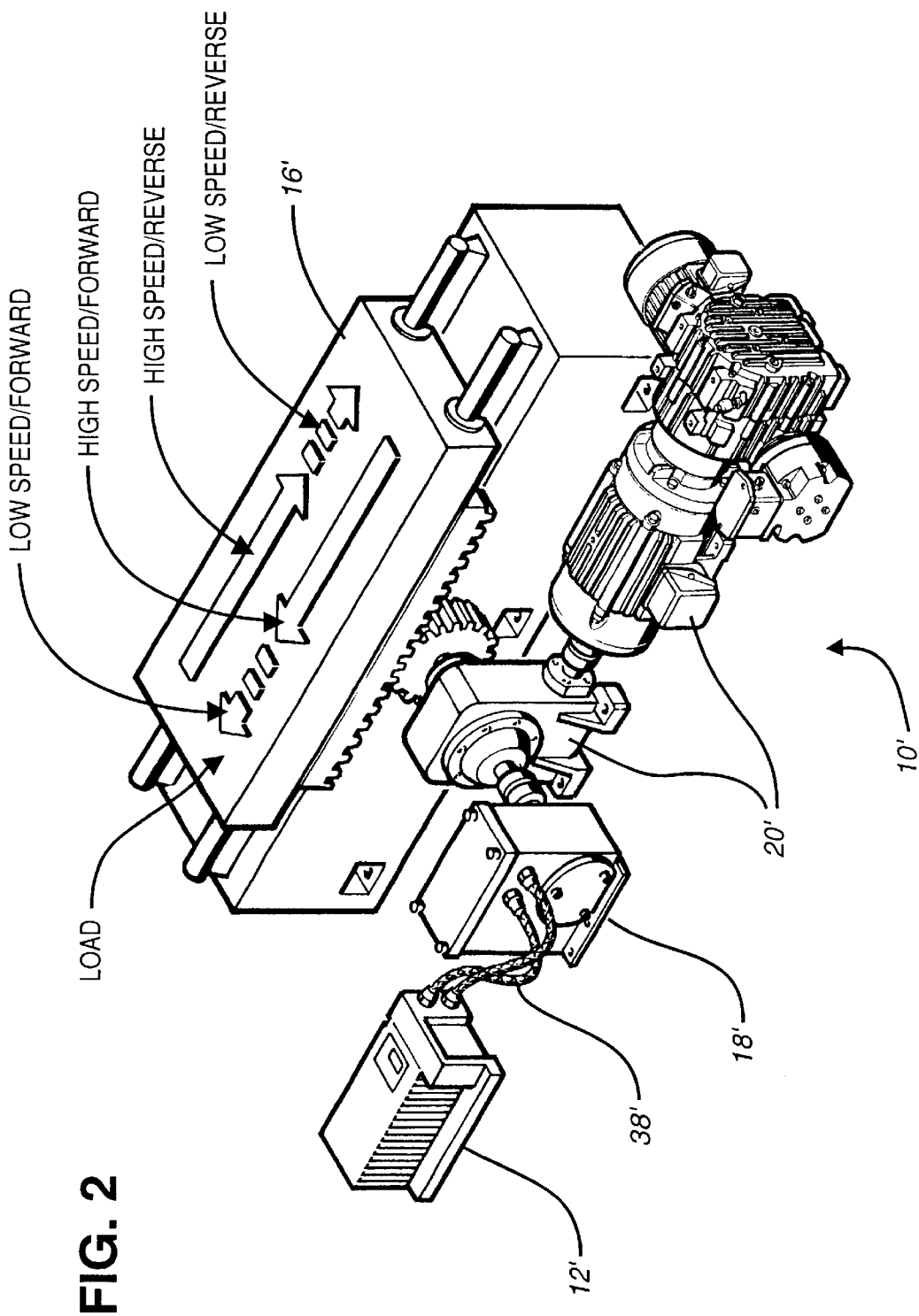
FIG. 2 is an illustration of another embodiment showing the use of the learning programmable limit switch in a typical motion control environment.

FIG. 2 illustrates one embodiment of the invention shown in FIG. 1. In this embodiment, like parts are identified with the same part numbers, except that the parts in FIG. 2 have a prime number ("'") added thereto. In the embodiment being illustrated in FIG. 2, the learning programmable limit switch 18' is coupled to an output shaft 20' of drive mechanism 14'. By way of illustration, the shaft 20' is drivingly conventionally coupled to driver mechanism 16' to move in the direction of double arrow A in FIG. 2.

In general, the output signals 18a and 18c (FIG. 4) generated by the programmable limit switch 18' are enabled (i.e., turned on or off) based upon the detected angular position of the output shaft 20'. These outputs are received by controller 12' which energizes the drive mechanism 14' in response thereto. The programmable limit switch 18' is user-programmed to receive a desired user motion profile 40 (FIG. 5). The method and routine executed by the programmable limit switch 18' for generating the outputs is described later herein.

Figure 3:
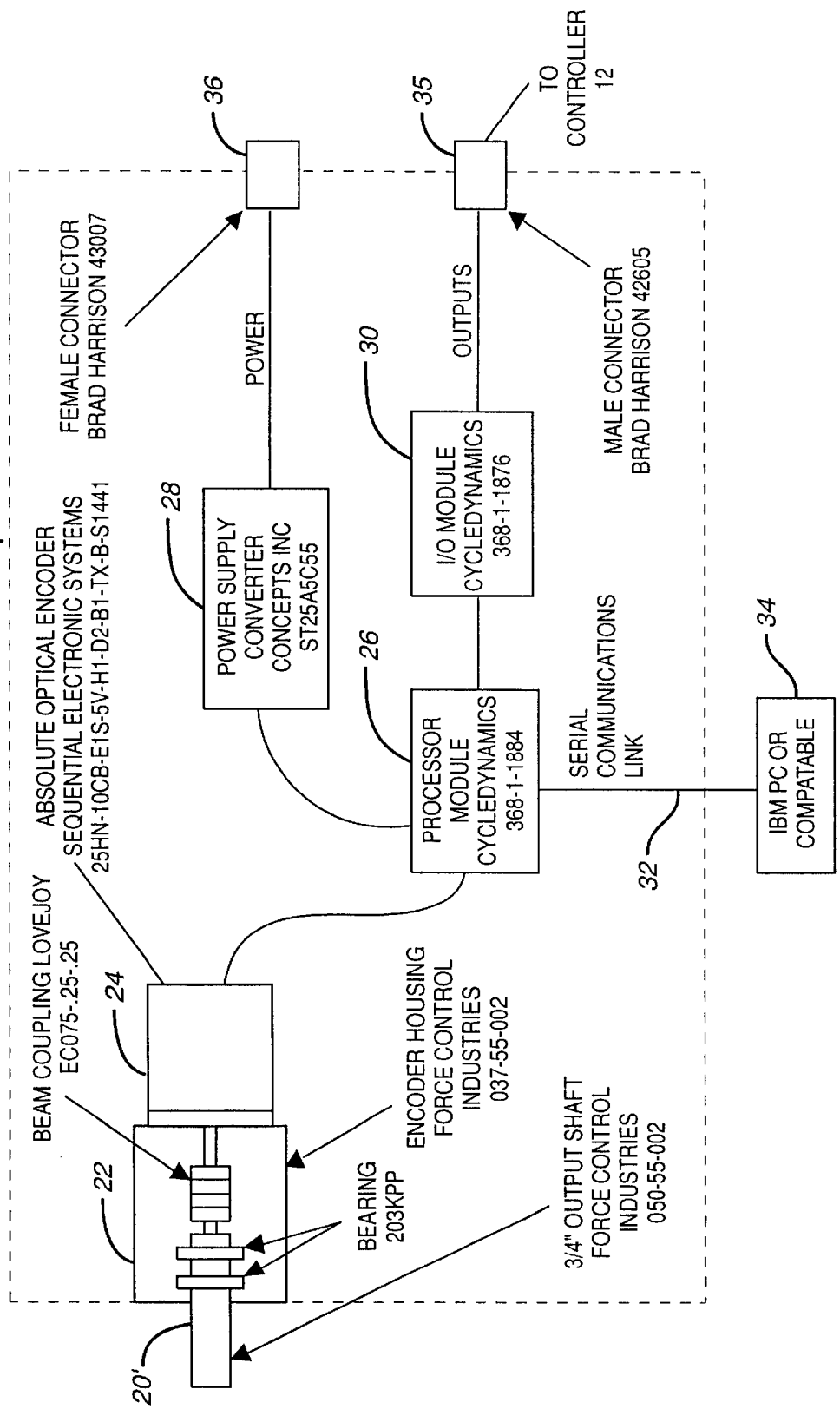
FIG. 3 is a schematic illustration of the learning programmable limit switch in accordance with one embodiment of the invention.

FIG. 3 shows details of the programmable limit switch 18'. Notice that the programmable limit switch 18' comprises an encoder housing 22' (FIG. 3) for housing a portion of the output shaft 20' and an encoder 24' which generates a timing signal 24a (FIG. 4) based upon the detected angular position of the output shaft 20' in a manner conventionally known. In the embodiment being described, the encoder 24' may be an absolute optical encoder, such as Model No. 25HN-10CB-ELS-5V-HI-D2-B1-TX-B-F-S1441 available from Sequential Electronic System of Elmsfield, N.Y., but it should be understood that other types of position detecting sensors may be used.

The programmable limit switch 18 (FIG. 3) further comprises a processor module 26, such as Model No. 368-1-1884 from Cycledynamics, Inc. of Fairfield, Ohio which is coupled and responsive to encoder 24 and which is coupled to a power supply 28 for providing power to the processor module 26. In the embodiment being described, the power supply 28 may be Model No. ST25A5C55 available from Convertors Concepts, Inc of Pardeeville, Wis.

The processor module 26 is also coupled to an input/output module 30, such as Model No. 368-1-1876 available from Cycledynamics of Fairfield, Ohio. The power supply 28 is coupled to a female connector 36, such as a Brad Harrison Model No. 43007 available from Daniel Woodhead Company of Northbrook, Ill. The input/output module 30 is coupled to a male connector 38, such as a Brad Harrison Model No. 42605 which is also available from Daniel Woodhead Company of Northbrook, Ill.

A serial communications link 32 couples the processor module 26 to a IBM compatible personal computer 34 so that the system may be easily programmed, monitored and controlled.

Figure 4:
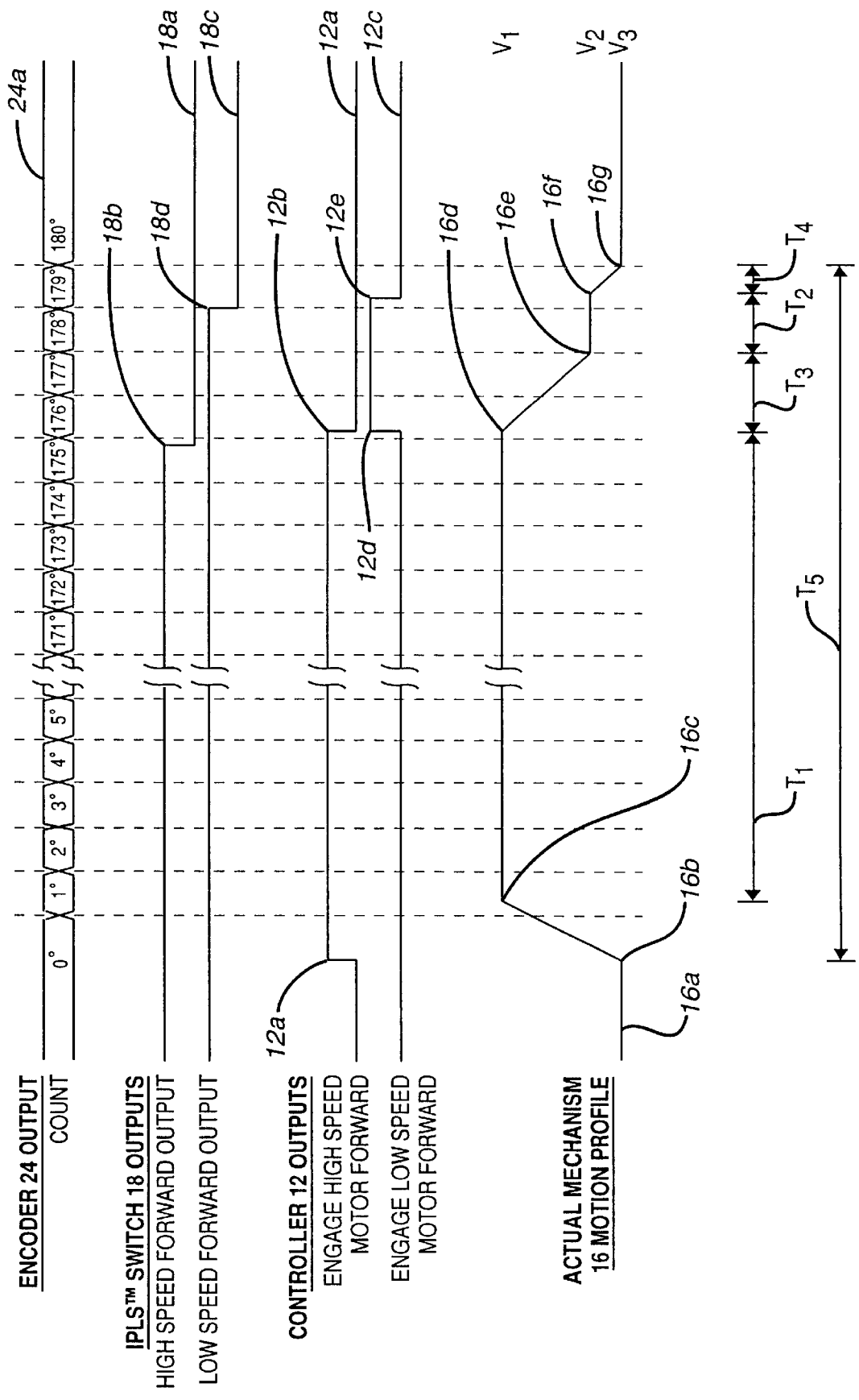
FIG. 4 illustrates a plurality of illustrative timing diagrams for various components of the system shown in FIG. 3.
Figure 5:
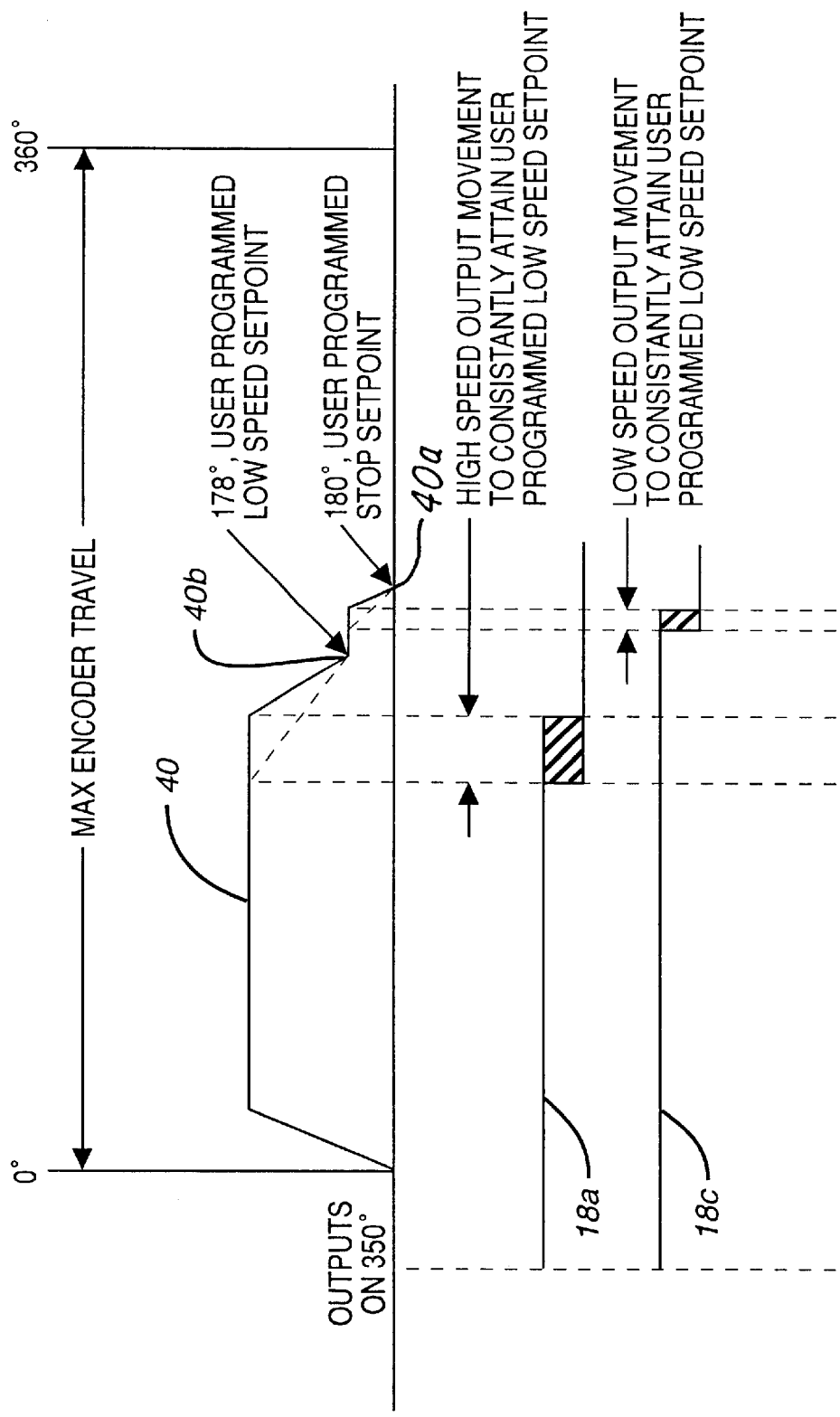
FIG. 5 is a waveform of a user-programmed motion profile which is used for illustration.

FIG. 4 shows various timing diagrams which illustrate the various correlation among the outputs of encoder 24, programmable limit switch 18 and controller 12, as well as the resultant motion of the driven mechanism 16, such as the transfer driver 16' in the illustration shown in FIG. 2. For ease of illustration, each encoder count occurs at approximately every degree.

Initially, controller 12 energizes drive system 14 using signals 12a and 12c. This causes drive mechanism 14 to drive the driven mechanism 16 at a first or high speed, $V_1$. In the embodiment being illustrated, the programmable limit switch monitors the output of encoder 24 and generates an output signal 18a which comprises a high to low disenable step or trigger at point 18b which, in turn, causes the controller 12 to disenable the high speed signal 12a at point 12b as shown.

The corresponding actual motion profile of the motion of the driven mechanism 16 is illustrated by the waveform 16a. Notice that at point 16b the driven mechanism 16 is accelerated until it achieves the first or high speed, $V_1$ at point 16c which continues for a first period of time $T_1$. Notice that at point 18b, the switch 18 generates a disenable signal in response to the encoder count achieving 175 degrees which is received by controller 12 which generates a disenable in response thereto at point 12b which causes the controller 12 to disenable the high speed signal at point 12b. Thus, at point 16d and after the controller 12 generates the disenable at point 12b, the drive mechanism 14 causes the driven mechanism 16 to begin decelerating. Notice that the output 18c from switch 18 remains enabled which causes controller 12 to generate and output a low speed signal 12c at point 12d which energizes drive mechanism 14 to drive the driven mechanism 16 at a second or slower speed $V_2$ at point 16e.

The second speed or slower speed or velocity $V_2$ which begins at point 16e in the motion profile 16a and continues for a period $T_2$ until programmable limit switch 18 disenables the low speed forward signal 18c at point 18d. In response to this disenable, controller disenables its output 12c at point 12e as shown.

Notice in the motion profile 16a that between points 16d and 16e the drive mechanism 14 is causing the driven mechanism 16 to change from the first or high speed or velocity $V_1$ to the second speed or velocity $V_2$ which begins at point 16e in FIG. 4. Time $T_3$ shows the corresponding period of time that it takes to cause the drive mechanism 14 to slow the driven mechanism 16 from the first speed or velocity $V_1$ to the second speed or velocity $V_2$. Likewise, the time period $T_4$ corresponds to the period of time in which it takes the drive mechanism 14 to slow the driven mechanism 16 from the second speed or velocity $V_2$ to the third speed or velocity $V_3$ which begins at point 16g in FIG. 4.

In the illustration being described, the first velocity or speed $V_1$ is on the order of about 100 RPM, the second speed or velocity $V_2$ is on the order of about 10 RPM and the third velocity $V_3$ is zero. However, the programmable limit switch 18 may be used in any number of speed applications such as a single speed, slow speed start, as well as a multi-speed environment of the type illustrated herein. It should be appreciated, that the motion profile 16a of the driven mechanism 16 is merely one example of a profile with which the programmable limit switch 18 may be programmed.

It should be further appreciated from the diagrams illustrated in FIG. 4 that after the controller 12 initiates energization of the drive mechanism 14 to energize the driven mechanism 16, the programmable limit switch 18 tracks the angular motion, via the output of encoder 24 which tracks the motion of the output shaft 20 (FIG. 2). The programmable limit switch 18 cycles its outputs in the form of signals 18a and 18c based on the motion profile 16a which correlates directly to the movement of the driven mechanism 16. Thus, it should be appreciated that when motion of output shaft 20' and, therefore, driven mechanism 16 begins, encoder 24 generates the position count 24a corresponding to the angular movement of the output shaft 20. The programmable limit switch 18 uses the position count, as well as the timing between position counts, to track the motion profile 16a against a user-programmed motion profile, such as the user-programmed profile 40 illustrated in FIG. 5.

As mentioned previously and in the manner described later herein, the programmable limit switch 18 will provide a learned passive feedback in that if the programmable limit switch 18 determines that the output shaft 20 and, therefore, the driven mechanism 16 did in fact properly follow the user-programmed motion profile 40 (FIG. 5), then it will continue generating the outputs 18a and 18c in their respective positions.

If, however, the programmable limit switch 18 determines that the motion profile of mechanism 16 did not follow the user-programmed motion profile 40, then programmable limit switch 18 will adjust the turn off or trigger positions of the enabling outputs 18b and 18d (FIG. 4) until the operational characteristics of drive system 10 and the proper positions at which the change from $V_3$ to $V_2$ (point 16d) and $V_2$ to $V_1$ (point 16f) are "learned". This facilitates ensuring that the actual motion profile 16a of mechanism 16 corresponds to the user-programmed profile 40.

It has been found empirically that the actual profile 16a may change due to various environmental concerns, such as the temperature of drive mechanism 14. A significant feature of the process and method of the present invention is to maintain time period $T_2$ at a relatively consistent desired time, so that it does not either shorten or lengthen the overall cycle time $T_5$ in a manner which causes the driven mechanism 16 to "undershoot" or "overshoot" its desired positions at points 40a and 40b (FIG. 5). Thus, it should be appreciated that the programmable switch 18 generates outputs 18a and 18c which effect controller 12 outputs 12a and 12c, respectively. Then outputs, in turn, impact the duration of the time periods $T_1$ and $T_2$ in a manner which will cause the actual motion profile 16 to achieve the desired motion profile 40 (FIG. 5). Stated another way, the programmable limit switch 18 will generate outputs to account for undesired variations in the slope of the lines between points 16d and 16e and points 16f and 16g of the method motion profile 12 such that the velocities at points 16e and 16g are the same as the velocities programmed by the user at points 40b and 40a, respectively.

Figure 6:
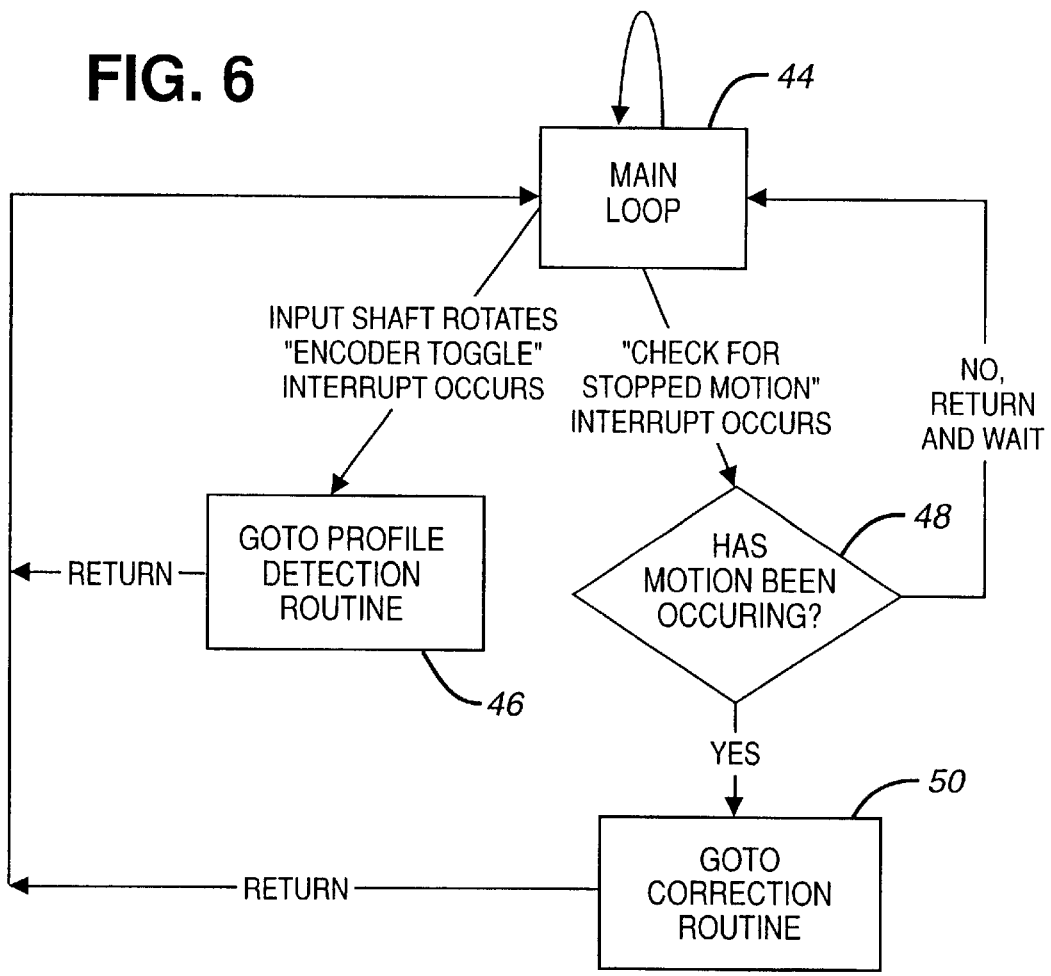
FIG. 6 is a schematic illustration of a learning procedure and method in accordance with one embodiment of the invention.

The method and process of maintaining the cycle time and providing the learned passive feedback for controlling drive system 10 will now be described relative to FIG. 6 where encoder 24 generates the encoded count or signal 24a (FIG. 4) in response to the rotation of output shaft 20 (FIGS. 2 and 3). Programmable limit switch 18 will proceed to a profile detection routine at block 46 (FIG. 6). If the encoder count signal 24a does not change states, then a no-motion timeout will be generated by processor 26. The no-motion timeout will cause processor module 26 or switch 18 to proceed to a correction flow routine (block 50) if, at decision block 48, it is determined that motion has been occurring. If it has not, then the switch 18 continues in the main processing loop 44. The main processing loop simply spins in a tight loop in a manner conventionally known waiting for serial data from the communication port or is interrupted by an encoder status change or no motion timeout.

For purposes of illustrating the profile detection and correction flow routines, the setpoints indicated by points 40b and 40a correspond to the points at which output shaft 20 first begins the second speed or velocity $V_2$ and the third speed or velocity $V_3$. In the illustration being described, the first and second setpoints 40b and 40a are set or programmed by the user to be at 178 degrees and 180 degrees, respectively, as shown in FIG. 5.

Before addressing the aforementioned routines, a brief description of the data structure or array utilized will now be discussed. In general, the routines utilize two main data structures or arrays which are organized as shown below. The first data structure is identified as the action data structure. This action data structure will be used in a circular array which contains data organized as follows:

Action Data Structure: Used in a circular array (hereinafter "action array") containing all of the actions generated to control the motion of driver mechanism 16 driven in accordance with the user-programmed motion profile(s) setpoints.

| | |
|---|---|
| Averaged Position Count | is the encoder count at which some action should occur (i.e., outputs turn on or off) |
| Action Type | Type of action (i.e., forward start, forward single trigger, multi-trigger and the like) |
| Outputs Value | Which outputs should change for the averaged position count |
| Next Action Pointer | Pointer to the next action when cycling forward through this array |
| Previous Action Pointer | Pointer to the previous action when cycling reverse through this array |

The second data structure or array is identified as the setpoint data structure or array. The setpoint data structure will be used also in a circular array containing data organized as follows:

Setpoints Data Structure: Used in a circular array (hereinafter "setpoints array") containing all of the user-programmed motion profile(s) setpoints.

| | |
|---|---|
| Setpoint Position Count | is the encoder count of a pre-programmed user setpoint |
| Previous Averaged Position Count Queue | Queue containing a history of previous triggers for that setpoint. These entries are then used to generate an average trigger that will be inserted into an action entry within the action array |
| Setpoint Entry | Type of setpoint (e.g., forward setpoint (correctable), forward_pls (non-correctable) and the like) |
| Pointer to Action Entry into Action Array | Pointer that points to the action within the action array that corresponds to that setpoint. Allows quick access to action when a trigger correction is required. |
| Next Setpoint Pointer | Pointer to the next action when cycling forward through this array |
| Previous Setpoint Pointer | Pointer to the previous action when cycling reverse through this array |

It should be noted that these two arrays are cross-linked together by pointers to allow quick access from the setpoint within the setpoints array to its' corresponding action, or trigger, within the action array. Although not shown, it should be appreciated that data and arrays may be organized in other manners as desired.

The profile detection routine (block 46) will now be described relative to FIG. 7A wherein encoder 24 generates the encoder signal, such as signal 24a in FIG. 4, at block 52. The routine continues to block 54 where at least one encoder state change or interrupt is generated and received by processor module 26. At block 56, the routine continues where processor module 26 responds to the state change or interrupt and reads a new position count corresponding to the position of output shaft 20 into a temporary memory location (not shown).

Processor module 26 proceeds to calculate (block 58) a velocity of output shaft using the time between the new position count and a previous position count using the following formula:

$$V = \frac{D}{T};$$

where V is an angular velocity of output shaft 20 at the new position count;

D is the angular distance in degrees traveled by output shaft 20 between the new position count and the previous position count; and T is the time between the new position count and previous position count.

At decision block 60, it is determined whether the new position count is equal to the averaged position count stored in the currently selected action array entry in memory (not shown). If it is equal, then the state of the output signals 18a and 18c (illustrated in FIG. 4) are changed based upon the outputs value stored in the action array. Now move to the next action array entry in the action array using the next or previous action pointer based on the currently detected direction of movement.

The routine proceeds to block 64 where processor module 26 sets a plurality of flags if the calculated velocity V is within the limits of the user-programmed motion profile 40 (FIG. 5).

If the decision at decision block 60 is negative, then the routine proceeds to block 66 where the new position count is stored as the current position count.

At decision block 68, processor module 26 determines if the second speed or velocity $V_2$ is expected to start occurring. If it is not, then the routine proceeds to block 66 as shown. If it is, then processor module 26 determines at decision block 70 whether the second speed or velocity $V_2$ is occurring at the new position count by calculating and using an average of velocities of a predetermined number of past velocities within a velocity queue (not shown). If it is, then processor module 26 sets flags (not shown) to confirm that the user-programmed motion profile 40 (FIG. 5) was detected properly and completely (block 72 ). This procedure is done as a means to verify that the drive system 10 has moved in accordance with the user-programmed motion profile 40 (FIG. 5) and that the correction algorithm then may be applied to this index.

The routine then proceeds to block 74 where processor module 26 stores the new position count where low speed was determined to occur into a "found low speed position count" variable in memory (not shown). Thereafter, the routine proceeds to block 66 as shown.

If the decision at decision block 70 is negative, then the velocity determined at the new position count is saved into the velocity queue (not shown). Thereafter, the routine proceeds to block 66 as shown. After the velocity and the new position count are evaluated, the new position count is stored at block 66 as the current position count, the routine returns to the main loop (FIG. 6).

As mentioned previously herein relative to FIG. 6, if no motion is detected at decision block 48, then the processor module 26 performs a correction routine (block 50 in FIG. 6) which begins at decision block 78 (FIG. 7B) where processor module 26 determines whether the user-programmed profile 40, as represented by the data in the setpoints array, was detected properly. If it was, then the routine proceeds to block 80 where processor module 26 locates user-programmed setpoints, such as setpoints 40b and 40a in FIG. 5, within the setpoints array. If the decision at decision block 78 was negative, then the motion profile was not detected properly and the routine proceeds to decision block 82 which will be described later herein.

After block 80, processor module 26 uses the current encoder count of encoder signal 24a as the actual point 16g (FIG. 4) at which the drive mechanism 16 achieves the third speed or velocity $V_3$. If this position equals the user-programmed setpoint 40a (FIG. 5), then the routine proceeds to decision block 86 as shown. If, however, the decision at decision block 84 is negative, then processor module 26 calculates a difference between the actual position 16g (FIG. 4) and the user-programmed position which corresponds to setpoint 40a (FIG. 5) at block 88. The routine proceeds to block 90 where processor module 26 applies the calculated difference to the averaged position count or trigger within the action array in order to generate a new trigger count or position.

At block 92, the processor module 26 stores the corrected or learned trigger for that motion index in a previous averaged position count queue in the setpoints array and proceeds to block 94. At block 94, processor module 26 calculates a new average using a predetermined number of triggers stored within the averaged position count queue within the setpoints array and writes the averaged trigger into the averaged position count within the action array.

Thereafter, or if the decision at block 84 is yes, then the routine proceeds to decision block 86 where it is determined if the position at point 16e (FIG. 4) is equal to the user-programmed position 40b (FIG. 5). If it is, then the routine proceeds to block 87 (FIG. 7C) where processor module 26 re-sorts the entire action array based upon the averaged position count entry.

If the decision at decision block 86 is negative, then processor module 26 calculates a difference between the actual position 16e (FIG. 4) and the user-programmed position which corresponds to setpoint 40b (FIG. 5) at block 89. The routine proceeds to block 91 where processor module 26 applies the calculated difference to the averaged position count within the action array in order to generate a new trigger count.

At block 96, the processor module 26 stores the corrected or learned trigger for that motion index in a previous averaged position count queue in the setpoints array and proceeds to block 98. At block 98, processor module 26 calculates a new average using a predetermined number of triggers stored within the averaged position count queue within the setpoints array and writes the averaged trigger into the averaged position count within the action array. Thereafter, the routine proceeds to block 87 (FIG. 7C).

As mentioned previously herein, if the decision at decision block 78 (FIG. 7B) is negative, then the routine proceeds to decision block 82 (FIG. 7C) where processor module 26 determines if part of the actual motion profile 16a (FIG. 4) was detected properly. If it was, then it is determined at decision block 100 (FIG. 7C) whether the second speed or velocity $V_2$ has been learned. If part of this motion profile was not detected, then processor module 26 clears all flags (block 102 ) and the routine then returns to the main program of FIG. 6.

If the decision at decision block 100 is negative, then the routine proceeds to decision block 104 where processor module 26 determines if the stored low speed velocities within the velocity queue are stable. If the answer is yes, then the routine proceeds to block 106 where processor module 26 stores the average of low speed velocity queue into a suitable buffer (not shown). At block 108, the processor module 26 sets a learned low speed velocity flag. Thereafter, or if the decision at decision block 104 is negative, the routine returns to the main loop in FIG. 6.

If the decision at decision block 100 is affirmative, then processor module 26 proceeds to locate the actual setpoint 40b corresponding to the point 16e within the setpoints array at block 110. It should be understood that if the processor module 26 did not detect the second velocity $V_2$, yet has learned the second velocity $V_2$, it is presumed that driven mechanism 16 (FIG. 1) must have overshot the desired setpoint 40b which prevented the second velocity $V_2$ from occurring (FIG. 5). Consequently, processor 26 will adjust the trigger point or output 18b generated by switch 18 in order to back off the trigger so that the transition between velocities $V_1$ to $V_2$ will occur sooner so that the second velocity $V_2$ may occur properly. This procedure is further illustrated relative to FIGS. 8A–8E and 9A–9C.

At block 116, processor module 26 calculates a reduced position count using the averaged position count in the action array as pointed to by the setpoint entry in the setpoint array. The processor module 26 also subtracts a fixed or predetermined number of encoder counts, which generally correspond to the encoder's resolution, to generate a new trigger position. Thus, processor module 26 calculates (block 116 in FIG. 7C) a reduced position count by decrementing the averaged position count by the predetermined number of encoder counts.

The routine proceeds to block 118 where the processor module 26 stores the corrected or learned trigger in the previous averaged position count queue in the setpoints array and proceeds to block 120. At block 120, processor module 26 calculates a new average using a predetermined number of triggers stored within the previous averaged position count queue within the setpoints array and writes the averaged trigger into the averaged position count within the action array. The new trigger provides a "corrected" trigger that will facilitate causing controller 12 to energize drive mechanism 14 to drive driven mechanism 16 in accordance with the user-programmed profile. Thereafter, the routine proceeds to block 87 as shown.

An illustration of the method of the invention will now be described relative to FIGS. 8A–8D and 9A–9C. In the first illustration shown in FIGS. 8A–8D, the programmable limit switch 18 learns the appropriate output 18b or trigger which will locate the transition from the first speed or velocity $V_1$ to the second speed or velocity $V_2$. In response to the triggers and motion of output shaft 20, processor module 26 detects an actual second speed or velocity $V_2$ at 179 degrees. Processor module 26 then adjusts the trigger or output point 18b leftward, as shown in FIG. 8B, so that the trigger occurs earlier at 173 degrees as shown. This adjustment of the trigger, in turn, causes the drive mechanism 14 to begin driving the driven mechanism at the second speed or velocity $V_2$ at 178 degrees as shown.

Notice also in FIG. 8A that processing module 26 detects the transition between the second speed or velocity V2 to the third speed or velocity $V_3$ to stop at point 16g or 180 degrees. Because this is consistent with the user-programmed transition at point 40a in FIG. 5, the switch 18 makes no adjustment to the output or trigger signal 18c at point 18d.

Notice in FIGS. 8C and 8D that, as the drive system 10 warms up it takes longer for the system 10 to transition from the first speed or velocity $V_1$ to the second speed or velocity $V_2$, the time period $T_3$ (FIG. 4) increases. This results in an "overshoot" of the beginning of the second speed or velocity $V_2$, as illustrated in FIG. 8C.

This cycle and process are repeated and processor module 26 again adjusts the output or trigger point 18b of signal 18a of switch 18 in the manner described herein so that it occurs at 172 degrees (FIG. 8D), rather than 173 degrees (FIG. 8C). The adjusted output trigger 18b, in turn, causes drive mechanism 14 to drive the driven mechanism 16 such that the transition to the second speed or velocity $V_2$ occurs earlier. Notice that the actual motion profile (FIG. 8D) now corresponds to the user-programmed profile 40 (FIG. 5) and, consequently, processor module 26 performs no further adjustment.

A second illustration is provided in FIGS. 9A–9C which shows the methodology of the present invention as applied to the drive system 10 which is operating in a dynamic environment which is in, for example, a cold machine condition. Notice in FIG. 9A, the programmable limit switch 18 first learns the position of the driven mechanism 16 resulting from energizing the drive mechanism 14 using the outputs or triggers 18b and 18d. In this illustration, switch 18 learns that for triggers 18b and 18d, the transitions between velocities V1 and V2 and between V2 and V3 occur at 174 degrees and 179 degrees, respectively. Processor module 18 utilizes the routines of FIGS. 7A–7C to determine that these transitions do not correspond to the user-programmed motion profile 40 (FIG. 5) which, in the illustration being described, established the desired transitions to begin occurring at 178 degrees (for transition V1 to V2 ) and 180 degrees (for transition V2 to V3 ). Accordingly, processor module 18 adjusts the outputs or triggers 18b and 18d to occur later at 172 degrees and 179 degrees, respectively, as illustrated in FIG. 9B.

The adjustments to outputs or triggers 18b and 18d cause drive mechanism 14 to energize driven mechanism 16 such that the driven mechanism 16 transitions V1–V2 and V2–V3 occur at 176 degrees and 179.5 degrees, respectively. These positions are detected by the switch 18 in the manner described earlier herein using encoder 24.

Processor module 26 determines that these detected positions, namely 179.5 degrees and 176 degrees, do not correspond to the user-programmed motion profile 40 (FIG. 5) which, as mentioned earlier, mandates that the transition points 16e and 16g occur at 178 degrees and 180 degrees, respectively. Consequently, the processor module 26 again adjusts the outputs or triggers 18b and 18d to occur at 174 degrees and 179.5 degrees, respectively, as shown in FIG. 9C. As illustrated in FIG. 9C, this adjustment results in the transitions at points 16e and 16g to occur at 178 degrees and 180 degrees, respectively. Processor module 26 detects these positions in the manner described earlier and determines that they are consistent with the programmed transitions (points 40b and 40a in FIG. 5). Consequently, no further adjustment to the outputs or triggers 18b and 18d are made.

It should be appreciated that the processor module 26 performs the routines illustrated in FIGS. 6 and 7A–7C with every 360 degree rotation of output shaft 20. It could, however, perform the detection, learning and adjustments either more or less frequently as required.

As illustrated in FIGS. 8A–8D and 9A–9C, the process is iterative and programmable limit switch 18 continues until the outputs or triggers 18b and 18d occur such that the corresponding transitions 16e and 16g ultimately occur at the user-programmed setpoints 40b and 40a (FIG. 5), respectively.

Advantageously, this system and method provide a learning programmable limit switch 18 which generates controlled outputs responsive to the detected angular position of the output shaft 20. The outputs are fed back to the PLC or prime controller 12 (FIG. 1) to provide a passive feedback for the controller to control the drive system such that it transitions between speeds or to a stop point at the desired positions based on the user-programmed motion profile 40 (FIG. 5).

While the method herein described, and the forms of apparatus for carrying these methods into effect, constitute preferred embodiments of this invention, it is to be understood that the invention is not limited to these precise methods and forms of apparatus, and that changes may be made in either without departing from the scope of the invention, which is defined in the appended claims.

What is claimed is:

1. A method of providing passive feedback for controlling a drive system comprising the steps of:

providing a programmable switch for facilitating controlling the operation of said drive system;

programming said programmable switch with a first programmed setpoint corresponding to a first position of said drive system, a second programmed setpoint corresponding to a second position of said drive system, a first initial trigger point corresponding to when said drive system performs a first change from a first speed to a second speed, and a second initial trigger point corresponding to when said drive system performs a second change from said second speed to a third speed;

energizing said drive system;

using said first and second initial trigger points to effect said first and second changes, respectively;

determining a first actual setpoint corresponding to a first actual position and a second actual setpoint corresponding to a second actual position;

comparing said first programmed setpoint to said first actual setpoint and said second programmed setpoint to said second actual setpoint and adjusting at least one of said first initial trigger point or said second initial trigger point to provide an adjusted first trigger point or an adjusted second trigger point, respectively, in response to said comparison; and repeating said energizing, triggering, determining and comparing steps and if said first and second actual setpoints are not within a predetermined tolerance range of said first and second programmed setpoints, respectively, then repeating said adjusting step.

2. The method as recited in claim 1 wherein said drive system comprises a driver, said determining step further comprising the steps of:

using a detected position to determine said first and second actual setpoints.

3. The method as recited in claim 2 wherein method further comprises the step of:

detecting said detected position using an encoder.

4. The method as recited in claim 1 wherein said first change in speed comprises a change from a first speed to a second speed wherein said first speed is greater than said second speed.

5. The method as recited in claim 4 wherein said second speed is zero.

6. The method as recited in claim 1 wherein said second change in speed comprises a change from a second speed to a third speed wherein said second speed is greater than said third speed.

7. The method as recited in claim 6 wherein said third speed is zero.

8. The method as recited in claim 4 wherein said second change in speed comprises a change from a second speed to a third speed wherein said second speed is greater than said third speed.

9. The method as recited in claim 8 wherein said third speed is zero.

10. A process for providing real-time passive feedback to facilitate maintaining a cycle time in a motion control system comprising the steps of:

providing a programmable switch capable of receiving a motion profile comprising a plurality of setpoints associated with a driver;

determining an actual motion profile associated with said driver;

comparing said actual motion profile to said plurality of setpoints and adjusting a plurality of trigger points in response thereto; and generating said real-time passive feedback in response to said comparing step by adjusting outputs of said programmable switch in response to said comparing step such that said cycle time is achieved and maintained.

11. The process as recited in claim 10 wherein said process further comprises the steps of:

determining a velocity of said driver for at least one setpoint;

comparing said velocity to a desired velocity at said at least one setpoint;

adjusting said outputs of said programmable switch if said velocity and said desired velocity are not equal.

12. The process as recited in claim 10 wherein said process further comprises the steps of:

adjusting a first trigger point associated with said motion profile if said driver did not achieve a desired velocity at a first programmable setpoint.

13. The process as recited in claim 10 wherein said process further comprises the steps of:

adjusting a second trigger point associated with said motion profile if a stop of said driver at a second programmable setpoint is not detected.

14. The process as recited in claim 12 wherein said process further comprises the steps of:

adjusting a second trigger point associated with said motion profile if a stop of said driver at a second programmable setpoint is not detected.

15. The process as recited in claim 10 wherein said determining step further comprises the steps of:

using a position indicated device associated with said driver and coupled to said programmable switch to facilitate performing said determining step.

16. The process as recited in claim 10 wherein said programmable switch comprises a programmable limit switch.

17. The process as recited in claim 14 wherein said process further comprises the steps of:

driving said driver at a first speed and a second speed, said first speed being greater than said second speed;

said second speed defining said velocity.

18. The process as recited in claim 17 wherein said velocity is zero.

19. The process as recited in claim 10 wherein said cycle time comprises a minimal cycle time.

20. A programmable limit switch for providing passive feedback for use in a drive system comprising a driver under the control of a controller having a position indicated device associated therewith for providing a first position count and a second position count, said switch comprising:

programming means for receiving a first programmed setpoint corresponding to a first position of said drive system, a second programmed setpoint corresponding to a second position of said drive system, a first initial trigger point corresponding to a first position at which said drive system performs a first change from a first speed to a second speed, and a second initial trigger point corresponding to a second position at which said drive system performs a second change from said second speed to a third speed;

determining means for determining a first actual setpoint corresponding to said first position count generated by said position indicating device and a second actual setpoint corresponding to said second position count generated by said position indicating device; and learning means for comparing said first programmed setpoint to said first actual setpoint and said second programmed setpoint to said second actual setpoint, for adjusting at least one of said first initial trigger point or said second initial trigger point to provide an adjusted first trigger point or an adjusted second trigger point, respectively, in response to said comparison so that said first and second actual setpoints are within a predetermined tolerance range of said first and second programmed setpoints, respectively.

21. The programmable limit switch as recited in claim 20 wherein said position indicating device generates a plurality of position counts, said determining means using said plurality of position counts to determine said first and second actual setpoints.

22. The programmable limit switch as recited in claim 20 wherein said first change in speed comprises a change from a first speed to a second speed wherein said first speed is greater than said second speed.

23. The method as recited in claim 22 wherein said second speed is zero.

24. The programmable limit switch as recited in claim 20 wherein said second change in speed comprises a change from a second speed to a third speed wherein said second speed is greater than said third speed.

25. The programmable limit switch as recited in claim 24 wherein said third speed is zero.

26. The programmable limit switch as recited in claim 22 wherein said second change in speed comprises a change from a second speed to a third speed wherein said second speed is greater than said third speed.

27. The programmable limit switch as recited in claim 26 wherein said third speed is zero.

28. A drive system capable of maintaining a cycle time comprising:
    a motion control system comprising:
        a position indicated device associated with a driven driver, said position indicating device being capable of generating a plurality of detected position counts;
        a programmable controller capable of receiving a desired motion profile comprising a plurality of setpoints for said driven driver and for determining an actual motion profile using said plurality of detected position counts; and
    a processor for comparing said actual motion profile to said plurality of setpoints and adjusting a plurality of trigger points in response thereto in order to generate a real-time passive feedback by adjusting outputs of said programmable controller in response to said comparison such that said cycle time is maintained at a desired level.

29. The drive system as recited in claim 28 wherein said programmable controller determines a velocity of said driver for at least one of said plurality of setpoints using said plurality of detected position counts, compares said velocity to a desired velocity at said at least one setpoint and adjusts said outputs of said programmable controller if said velocity and said desired velocity are not equal.

30. The drive system as recited in claim 28 wherein said plurality of trigger points comprises a first trigger, said programmable controller outputs said first trigger associated with said motion profile if said driver does not achieve a desired velocity at a first programmed setpoint associated with said motion profile.

31. The drive system as recited in claim 28 wherein said plurality of trigger points comprises a second trigger, said programmable controller outputs a second trigger associated with said motion profile if a stop of said driver at a second programmable setpoint is not detected.

32. The drive system as recited in claim 30 wherein said plurality of trigger points comprises a second trigger, said programmable controller outputs said second trigger associated with said motion profile if a stop of said driver at a second programmable setpoint is not detected.

33. The drive system as recited in claim 28 wherein said programmable controller comprises a programmable controller and said position indicating device comprises an absolute optical position indicating device.

34. The drive system as recited in claim 31 wherein said drive system further comprises:
    a driver for driving said driver at a first speed and a second speed, said first speed being greater than said second speed;
    said second speed defining said velocity.

35. The drive system as recited in claim 28 wherein said drive shaft is operatively coupled to one of the following: a transfer drive, a lift table, an indexing mechanism or an indexing table.

36. The drive system as recited in claim 34 wherein said velocity is zero.

37. The drive system as recited in claim 29 wherein said desired velocity is on the order of less than 100 RPM.

38. The drive system as recited in claim 28 wherein said programmable controller is operatively coupled to a clutch, a brake or a variable speed drive motor, a hydraulic motor, a pneumatic drive.

* * * * *